(12) United States Patent
Day

(10) Patent No.: US 8,798,606 B2
(45) Date of Patent: Aug. 5, 2014

(54) METHOD OF ENABLING A WIRELESS INFORMATION DEVICE TO AUTOMATICALLY MODIFY ITS BEHAVIOUR

(75) Inventor: Warren Godfrey Day, Surrey (GB)

(73) Assignee: Nokia Corporation, Espoo (FI)

( * ) Notice: Subject to any disclaimer, the term of this patent is extended or adjusted under 35 U.S.C. 154(b) by 230 days.

(21) Appl. No.: 10/559,959

(22) PCT Filed: Jun. 10, 2004

(86) PCT No.: PCT/GB2004/002477
§ 371 (c)(1),
(2), (4) Date: Sep. 8, 2006

(87) PCT Pub. No.: WO2004/110040
PCT Pub. Date: Dec. 16, 2004

(65) Prior Publication Data
US 2007/0060107 A1   Mar. 15, 2007

(30) Foreign Application Priority Data
Jun. 10, 2003 (GB) .................................. 0313385.7

(51) Int. Cl.
*H04B 1/38* (2006.01)
(52) U.S. Cl.
USPC ........................................ 455/418; 455/414.1
(58) Field of Classification Search
USPC ..................... 340/309.16; 455/550.1, 404.1
See application file for complete search history.

(56) References Cited

U.S. PATENT DOCUMENTS

| | | | |
|---|---|---|---|
| 5,933,778 A | 8/1999 | Buhrmann et al. | |
| 6,052,563 A * | 4/2000 | Macko | 340/7.1 |
| 6,418,309 B1 | 7/2002 | Moon et al. | 455/418 |
| 6,457,132 B1 | 9/2002 | Borgendale et al. | |
| 6,741,855 B1 * | 5/2004 | Martin et al. | 455/419 |
| 6,831,970 B1 * | 12/2004 | Awada et al. | 379/201.01 |
| 6,847,892 B2 * | 1/2005 | Zhou et al. | 701/213 |
| 7,069,027 B2 * | 6/2006 | Miriyala | 455/456.4 |
| 7,321,920 B2 * | 1/2008 | Washburn | 709/206 |
| 2001/0006893 A1 | 7/2001 | Yoshioka | |

(Continued)

FOREIGN PATENT DOCUMENTS

| | | |
|---|---|---|
| EP | 0 399 520 | 11/1990 |
| EP | 0399520 A2 | 11/1990 |

(Continued)

OTHER PUBLICATIONS

Combined Search and Examination Report, dated Nov. 22, 2004, issued in corresponding UK Application No. GB 0412989.6.

*Primary Examiner* — Marcos Batista
*Assistant Examiner* — Frank Donado
(74) *Attorney, Agent, or Firm* — Alston & Bird LLP

(57) ABSTRACT

An end-user enters time sensitive information into an application; this, for example, may be an entry (e.g. 'meeting', or 'lunch with Bob') against specific times in an agenda or calendar application. Then, a different application on the device can utilize that information to modify the device behaviour appropriately. For example, say the 'meeting' in the calendar application is listed to last between 10 am and 11 am; then, during that hour, the telephone application in the device (that enables telephone functions of the device to be controlled) could automatically be set to a 'silent' profile so that the device does not ring on an incoming call, but instead only vibrates.

22 Claims, 2 Drawing Sheets

(56) References Cited

U.S. PATENT DOCUMENTS

| | | |
|---|---|---|
| 2002/0116541 A1 | 8/2002 | Parker et al. |
| 2002/0142792 A1 | 10/2002 | Martinez |
| 2003/0001727 A1* | 1/2003 | Steinmark ............... 340/309.15 |
| 2003/0100336 A1 | 5/2003 | Cronin ............................ 455/556 |
| 2004/0078256 A1* | 4/2004 | Glitho et al. ........................ 705/8 |
| 2004/0086094 A1* | 5/2004 | Bosik et al. ................... 379/88.12 |
| 2004/0198427 A1* | 10/2004 | Kimbell et al. ............ 455/556.1 |
| 2004/0224674 A1* | 11/2004 | O'Farrell et al. .............. 455/418 |
| 2005/0153729 A1* | 7/2005 | Logan et al. .................. 455/550.1 |
| 2006/0121912 A1* | 6/2006 | Borjesson .................. 455/456.1 |
| 2007/0060107 A1* | 3/2007 | Day ........................... 455/414.1 |
| 2008/0261633 A1* | 10/2008 | Lazaridis et al. ............. 455/466 |

FOREIGN PATENT DOCUMENTS

| | | |
|---|---|---|
| EP | 0865188 A2 | 9/1998 |
| EP | 1 047 253 | 10/2000 |
| EP | 1047253 A2 | 10/2000 |
| EP | 1606709 A1 | 12/2005 |
| EP | 1636973 A1 | 3/2006 |
| GB | 2 323 245 | 9/1998 |
| GB | 2323245 A | 9/1998 |
| GB | 2 370 196 | 6/2002 |
| GB | 2370196 A | 6/2002 |
| GB | 2 375 690 | 11/2002 |
| GB | 2375690 A | 11/2002 |
| GB | 2 396 779 | 6/2004 |
| GB | 2396779 A | 6/2004 |
| JP | 2002-111569 | 4/2002 |
| WO | WO 99/21101 | 4/1999 |
| WO | WO 01/35687 | 5/2001 |
| WO | WO 01/35687 A1 | 5/2001 |
| WO | WO-0137521 A2 | 5/2001 |
| WO | WO-0154381 A2 | 7/2001 |
| WO | WO 03/056791 A1 | 7/2003 |
| WO | WO 2004/004295 A1 | 1/2004 |
| WO | WO-2004/097638 A1 | 11/2004 |
| WO | WO-2004/110040 A1 | 12/2004 |
| WO | WO 2004/110040 A1 | 12/2004 |

* cited by examiner

US 8,798,606 B2

METHOD OF ENABLING A WIRELESS INFORMATION DEVICE TO AUTOMATICALLY MODIFY ITS BEHAVIOUR

CROSS REFERENCE TO RELATED APPLICATIONS

This application claims the priority of PCT/GB2004/002477 filed on 10 Jun. 2004 and GB 0313385.7 filed on 10 Jun. 2003, the entire contents of which are hereby incorporated in total by reference.

BACKGROUND OF THE INVENTION

1. Field of the Invention

This invention relates to a method of enabling a wireless information device to automatically modify its behaviour. The term 'wireless information device' used in this patent specification should be expansively construed to cover any kind of device with one or two way wireless communication capabilities and includes without limitation radio telephones, smart phones, communicators, personal computers, computers and wireless enabled application specific devices such as cameras, video recorders, asset tracking systems etc. It includes devices able to communicate in any manner over any kind of network, such as GSM or UMTS, CDMA and WCDMA mobile radio, Bluetooth, IrDA etc.

2. Description of the Prior Art

Enabling devices to automatically alter their behaviour depending on the environment or 'context' of the device is a compelling foundation of 'context aware' computing. 'Context' can cover device specific variables such as location, as well as end-user variables such as presence (i.e. the availability of an end-user to use the device, his mood etc.). One common strand in context aware computing is the need for the device to itself become automatically aware of its context: for example, a location aware device I typically equipped with location finding equipment, such as GPS, or the ability to acquire location information from a nearby source.

Equipping a device with location awareness enables new capabilities: for example, the device could automatically turn itself off when in a location in which device operation is hazardous (in a hospital or aircraft, for example).

One of the assumptions behind context aware computing is that the context aware device automatically acquires its context understanding. The present invention does not however deal with devices that can automatically acquire context information; as such it departs from the general thrust of development in this area. Instead, it deals with the situation in which the end-user manually inputs context type information into the device.

Further, prior art context aware systems focus on location and presence information. The present invention does not, but instead deal specifically with time sensitive information.

SUMMARY OF THE PRESENT INVENTION

In a first aspect, there is a method of enabling a wireless information device to automatically modify its behaviour, comprising the steps of:
(a) an end-user entering time sensitive information into a first application running on the device;
(b) a second application running on the device receiving data from the first application, the data relating to the time sensitive information, and the second application then automatically changing the behaviour of the device appropriately in dependence on the data;
in which the first application sends the data indirectly to the second application via an intermediary server.

Hence, the present invention deals with the very specific situation of an end-user entering time sensitive information into an application; this, for example, may be an entry (e.g.'meeting', 'lunch with Bob', 'travelling', 'flying' etc). against specific times in an agenda or calendar application. Then, a different application on the device can utilise that information to modify the device behaviour appropriately. For example, say the 'meeting' in the calendar application is listed to last between 10 am and 11 am; then, during that hour, the telephone application in the device (that enables the telephone functions of the device to be controlled) could automatically be set to a suitable profile, such as a 'silent' profile so that the device does not ring on an incoming call, but instead only vibrates. The term 'application' should be expansively construed to cover any structure of software that performs one or more functions; it hence covers elements/portions of an operating system, utilities, client components, server components etc. Particularly, the second application could be OS system services, as opposed to an application which presents a unique interface to an end-user.

The first application sends the data indirectly to the second application via an intermediary server. The term 'server' is used in its normal, broad sense to mean a computer program that provides services to other computer programs. The server operates as an insulation layer, separating the first and second applications (the term 'insulation layer' is a term of art in design patterns). It allows there to be one or several first applications (i.e. applications into which the user can input tine sensitive information —such as (a) an agenda application into which the end-user can enter appointments, meetings, events etc. occurring at different defined times and (b) an alarm application into which the end-user can input a time he would like the device to sound an alarm). Further, the server enables any of these first applications to send data to any number of other applications that are to respond to the time sensitive information (or more specifically the data sent from the first application(s) that relate to this time sensitive information). Hence, a device might be in sleep mode, but the power management application be set to awake to normal mode when the alarm sounds: in this case, the first application is the alarm application and the second application is the power management application. The server can also ensure that the second, application is running and to launch it if necessary.

The approach of the present invention therefore provides a structured and systematic way for a device to intelligently use time sensitive information that the end-user has manually input.

The end-user could, in relation to the agenda application entry (e.g. 'meeting between 10 am and 11 am) select from a menu list (i.e. any kind of user interface that enables the end-user to select different options) a label to apply to .the entry, the label defining the type of behaviour change to be carried out by the second application. Hence, in relation to the 'meeting', 'lunch', 'travelling' or 'flying' etc. entries, the end-user could activate a pop-up menu of possible behaviour changes linked to that event. These might include the following selectable options:
(a) altering a telephone profile (e.g. silent, vibrate, loud, divert to voice mail etc.)
(b) altering the device ring tone
(c) altering the device user interface
(d) switching off telephone functionality (e) switching off the device entirely
(f) switching the device to a power save mode
(g) switching off one or more items of communications hardware (e.g. GPS, IR, Bluetooth, wireless LAN modules).

Generally, the second application automatically changes the behaviour of the device appropriately in dependence on the data from the first application for a time period determined by that data, e.g. silent mode for 1 hour to coincide with the meeting duration.

Another example is that there could be a dialog near the weekdays dialog in the agenda application with pairs of times the end-user enters to put the phone into power save mode, weekday sleep times, Saturday sleep times, Sunday sleep times etc.

If a conflict arises between the behaviour change due to the data from the first application and a different behaviour change input directly by the end-user to the first or the second application, then the different behaviour change may prevail —different types of changes may be allocated different priorities. Hence, the end-user could place the device directly back into sleep mode as or shortly after the alarm is sounding, to continue with the example above.

In one implementation, dynamically ensuring event-precedence is deterministic —meaning all events must guarantee to resolve to correct behaviour. So if one event has higher priority than another, this must be true under all circumstances ('if and only if'), and if two events have the same priority they must resolve to the same result each time.

If a conflict arises between the behaviour change due to the data from the first application and a different behaviour change input directly to the first or the second application, then a conflict resolution component determines which behaviour change prevails. A component designed to resolve conflicts can have a pre-defined list of conflict situations and the appropriate conflict resolution decision it should make given those inputs. The pre-defined conflict list may contains derivation rules, i.e. allow algebraic substitution rather that a static scenario and are thus are dynamic and will not cause compatibility problems; this facilitates third parties subscribing and publishing with the system.

An override component could also be provided to determine if a behaviour change due to the data from the first application is inappropriate and to then override that behaviour change. Hence, a device may be automatically about to wake up from sleep mode and sound the alarm as described above; but the device may also have a location sensor that informs it that it is in an aircraft and hence must not activate. In this circumstance, the wake up behaviour change would be over-ridden. The intermediary server could provide the conflict resolution component and override component.

In addition, it is possible for the end-user to enter time sensitive information into the first application running on the device; and for a second application running on a second, different device to receive data directly or indirectly from the first application, the data relating to the time sensitive information, and the second application then automatically changing the behaviour of the second device appropriately in dependence on the data. In this way, for example, an alarm notification set into one device could be used to trigger an action within or by an application running on a completely different device; the two devices might be connected over a wireless link. Hence, it could trigger a web camera to activate and send images to a web site.

In a second aspect, there is a wireless; information device programmed to automatically modify its behaviour, the device enabling:

(a) an end-user to enter time sensitive information into a first application running on the device;
(b) a second application running on the device to receive data directly or indirectly from the first application, the data relating to the time sensitive information, and the second application then automatically changing the behaviour of the device appropriately in dependence on the data;
in which the first application sends the data indirectly to the second application via an intermediary server.

DETAILED DESCRIPTION

Figure 1:
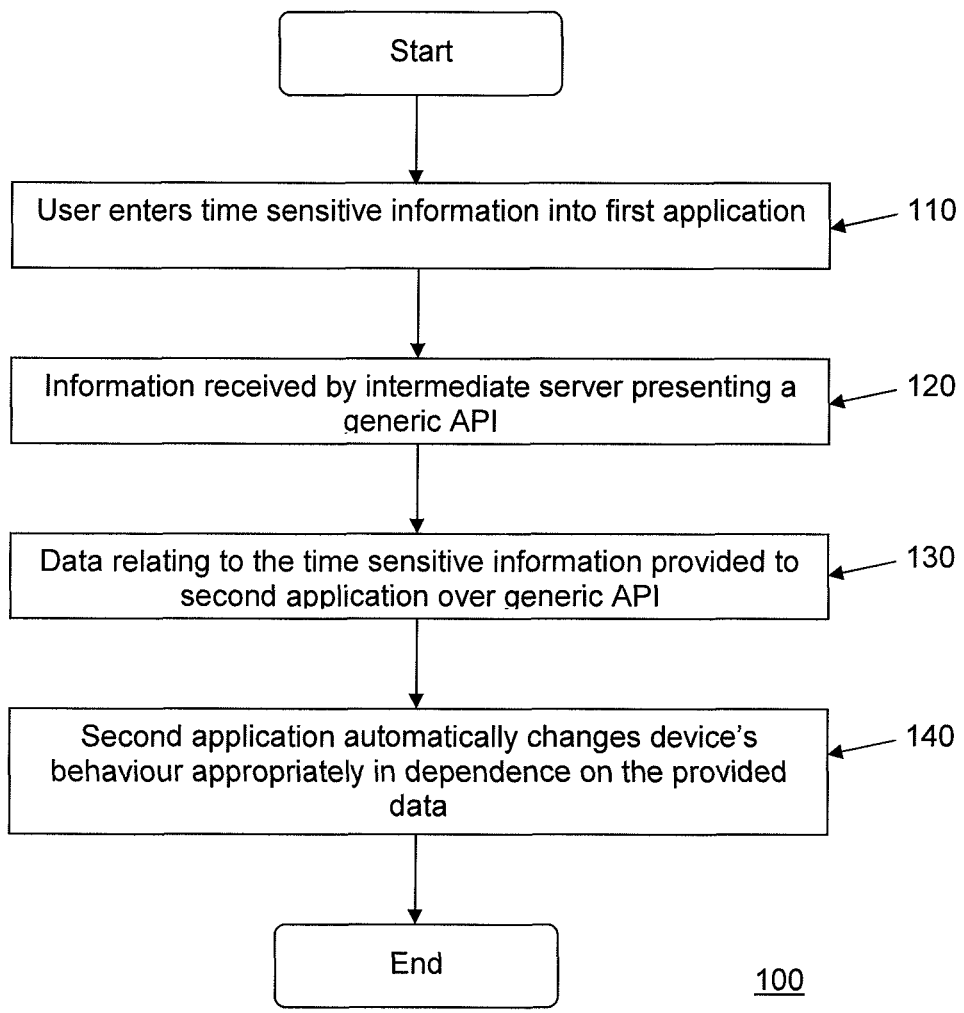
FIG. 1 is a flow chart illustrating a method of enabling a wireless information device to automatically modify its behavior.

The present invention can be implemented using a time sensitive information "insulation layer" in the wireless information device SymbianOS from Symbian Limited; the insulation layer separates and hence decouples applications and any system servers from a source application that an end-user initially enters time sensitive information into (e.g. an agenda or calendar application; an alarm application etc). Hence, an agenda application could provide time sensitive information to the insulation layer (a "change server" in a Symbian OS implementation). This server insulation layer then gives access to the time sensitive information data to any client (e.g. an application or system server) that needs it over a generic API. The client need not be limited to a client on the wireless information device itself, but can reside on a completely different device that does not have its own system for an end-user to input time sensitive information into. Hence, the device into which an end-user enters the time sensitive information can be used to control the behaviour of a completely different device over pre-set times.

There are many advantages to a time sensitive information insulation layer approach:

Application developers and network operators can develop time based applications without needing to understand the specifics of any time aware application; they merely need to be able to use the API.

Any application or resource on the device that needs time sensitive information entered by an end-user can now readily obtain it; this time sensitive information is made available across the entire OS. Hence, alarm notifications are no longer limited to just the stand alone alarm application itself, but can be used to initiate actions in any other application.

The time sensitive information can be readily supplied to different system servers—e.g. a system server which decided which power mode to adopt could do so depending on the time sensitive information—off mode at night; sleep mode in the evening etc.

A publish and subscribe API can be used to enable any such authorised server, to subscribe to time sensitive information published by any of the time aware applications (e.g. a calendar application).

A more detailed example follows: Assume that the end-user inputs into the agenda application that he has a meeting between defined times; the time of the meeting is then held in the agenda application's data. Assume then also that the device profile setting is in the phone application. This determines the ringing/call diversion behaviour of the device.

The invention provides an independent mechanism that can allow data communication between the 'source' agenda application and the 'destination' phone application. In the present invention, the manner in which the destination application behaves can be dictated in advance by the source application(s). The behaviour in the above example is to change the device profile to Meeting mode while during the meeting and back to whatever it was after the meeting ends.

The agenda application needs to communicate with phone application: in essence, the agenda application needs to say to the phone application: 'switch to meeting profile' at a specific time and switch back afterwards. (The phone application is programmed with the profiles and different phone companies will do different profiles. Hence, the agenda application would have to ask the phone application for what profiles it uses so the agenda application can ask the user which profile to use against each agenda entry type).

All applications have UIDs in SymbianOS so that is possible to have a change server with which all applications (including system services) register, to allow applications to send data/messages to other applications without actually making the destination application become the active application.

FIG. 1 illustrates a method 100 of enabling a wireless information device to automatically modify its behavior. In a first step 110 a user enters time sensitive information into a first application running on the device. This information is then received 120 from the first application by an intermediate server that presents a generic API. Data relating to the time sensitive information is then provided 130 over the generic API to a second application running on the device. The second application then changes 140 the device's behavior appropriately in dependence on the data, and not in dependence on automatically acquired context information.

Figure 2:
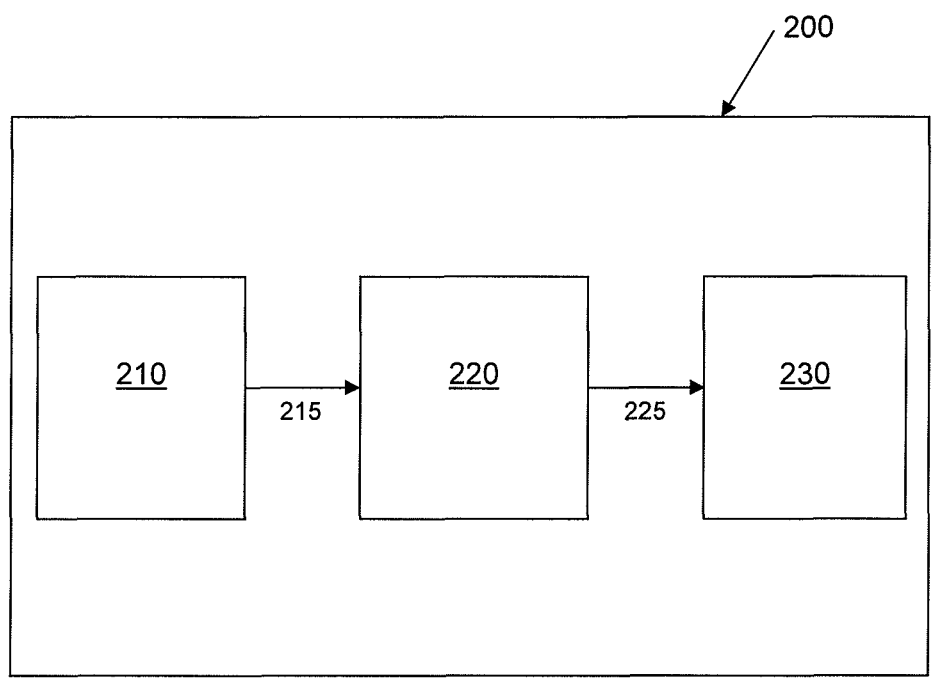
FIG. 2 is a schematic diagram illustrating a wireless information device programmed to automatically modify its behavior.

FIG. 2 illustrates a wireless information device 200 that is programmed to automatically modify its behavior. On the device are running a first application 210 and a second application 230. Also present is an intermediate server 220 illustrated in FIG. 2 as also running on the device. The intermediate server 220 presents a generic API and receives time sensitive information 215 from the first application 210, the time sensitive information 215 having been entered into the first application 210 by an end user. Data 225 based on the time sensitive information 215 is provided over the generic API from the intermediate server 220 to the second application 230, such that the second application 230 automatically changes the behavior of the wireless information device 200 appropriately in dependence on the data 225 and not in dependence on automatically acquired context information.

There are several practical issues to consider:
1. If the meeting finishes early, the user may manually change the profile; this should probably override the agenda application trying to changing it back when the meeting officially ends according to its data.
2. The user could also use a menu option to say the meeting has ended now and the end of the meeting time is automatically updated in the agenda to the current time.
3. The clock alerts the agenda application about the meeting. The agenda application then sends a message to the change server that consists of a UID (for the phone application) and function number in a message for the phone application to say which profile it is currently using. Then the agenda application sends a message to the change-server that consists of a UID (for the phone application), message UID and the message in a package descriptor that consists of a data structure of one profile switching message. It is best not to send the phone application a switch-back-at-11 message as this relies on the phone application both having to remember the current profile and implementing a request to some alarm functionality. So at 11 am, using the 10 am to 11 am meeting example, the agenda application then sends a message to switch back to the profile that the agenda application has stored; this message may be of a switch-back priority. If the user (or something of higher priority) modifies the profile during the meeting, then this switch-back message is ignored.

Also, setting back a profile to something previously set may not make any sense when we get to that time (e.g. there may have been an intervening higher priority event).

Conflict resolution is a particular feature of this approach: it could be that the source application (that has application specific information about the situation) or the intermediary change server (that has general device specific information about the state of the device). The change server would generally be best placed to perform priority conflict resolution or mediation. For example, if the end-user starts having a meeting in an airport lounge and continues as he gets on the plane: The phone is going to be told to switch off its air interface radio by the airport which is more important than changing profiles. If the device still works as a PDA, it can still make of the change profile settings so that the phone is in the appropriate mode when the end-user gets off the plane.

The invention claimed is:

1. A method comprising: receiving, at an intermediate server, data sent by a first application running on a wireless information device, the data relating to time sensitive information and a meeting profile entered by an end-user into the first application, wherein the intermediate server is configured to present a generic application programming interface and runs on the wireless information device; and providing the data, over the generic application programming interface, from the intermediate server to a second abdication running on the wireless information device, the data triggering the second application to cause the wireless information device to automatically change its behavior appropriately in dependence on the time and meeting profile data and not in dependence on automatically acquired location sensor information, determining in an instance in which a conflict arises between the behavior change due to the time and meeting profile data from the first application and a different behavior change that depends on the automatically acquired location sensor information, whether the different behavior change prevails; and in response to determining that the different behavior change prevails, implanting the different behavior change.

2. The method of claim 1 in which the first application is a calendar or agenda application and the time sensitive information comprises an entry into the calendar or agenda application.

3. The method of claim 2 in which the end-user selects from a menu list a label to apply to the entry, the label defining the type of behavior change to be carried out by the second application.

4. The method of claim 1 in which the first application is an alarm application and the time sensitive information defines an alarm time.

5. The method of claim 1 in which the second application is a telephone application that enables telephone functions of the wireless information device to be controlled.

6. The method of claim 1 in which data provided to the second application triggers the second application to cause the wireless information device to automatically change one or more of the following:

(a) altering a telephone profile
(b) altering the wireless information device ring tone
(c) altering the wireless information device user interface
(d) switching off telephone functionality
(e) switching off the wireless information device entirely
(f) switching the wireless information device to a power save mode
(g) switching off one or more items of communications hardware.

7. The method of claim 1, wherein in an instance in which a conflict arises between the behavior change due to the data from the first application and a different behavior change input directly to the first or the second application, the different behavior change input directly to the first or the second application prevails.

8. The method of claim 1, wherein in an instance in which a conflict arises between the behavior change due to the data from the first application and a different behavior change input directly to the first or the second application, then a conflict resolution component determines which behavior change prevails.

9. The method of claim 1 in which an override component determines whether a behavior change due to the data from the first application is inappropriate and overrides that behavior change in an instance in which it is determined that the behavior change is inappropriate.

10. The method of claim 8 in which the conflict resolution component is the server.

11. The method of claim 9 in which the override component is the server.

12. The method of claim 1 in which the second application causes the device to automatically change its behavior appropriately in dependence on the data from the first application for a time period determined by that data.

13. A wireless information device programmed to automatically modify its behavior, the device programmed to run: an intermediate sever configured to present a generic application programming interface and to receive data sent by a first application running on the wireless information device, the data relating to time sensitive information and a meeting profile entered by an end-user into the first application; wherein the intermediate server is further configured to provide, over the generic application programming interface, the data to a second application running on the wireless information device, the data triggering the second application to automatically change the behavior of the wireless information device appropriately in dependence on the time and meeting data and not in dependence on automatically acquired location sensor information, and in an instance in which a conflict arises between the behavior change due to the time and meeting profile data from the first application and a different behavior change that depends on the automatically acquired location sensor, information, the device is further programmed to: determine whether the different behavior change prevails; and in response to determining that the different behavior change prevails, implement the different behavior change.

14. The wireless information device of claim 13, wherein the first application is a calendar or agenda application and the time sensitive information comprises an entry into the calendar or agenda application.

15. The wireless information device of claim 13, wherein the first application is an alarm application and the time sensitive information defines an alarm time.

16. The wireless information device of claim 13, wherein the second application is a telephone application that enables telephone functions of the wireless information device to be controlled.

17. The wireless information device of claim 13, wherein the data provided to the second application triggers the second application to automatically change one or more of the following:
(a) altering a telephone profile
(b) altering the wireless information device ring tone
(c) altering the wireless information device user interface
(d) switching off telephone functionality
(e) switching off the wireless information device entirely
(f) switching the wireless information device to a power save mode
(g) switching off one or more items of communications hardware.

18. The wireless information device of claim 13, wherein in an instance in which a conflict arises between the behavior change due to the data from the first application and a different behavior change input directly to the first or the second application, the different behavior change input directly to the first or the second application prevails.

19. An apparatus comprising at least one processor, the at least one processor configured to cause the apparatus at least run a first application, a second application, and an intermediate sever, wherein the intermediate sever is configured, when run on the apparatus, to:
  cause a generic application programming interface to be presented; receive data sent by the first application, the data relating to time sensitive information and a meeting profile entered by an end-user into the first application;
  provide the data, over the generic application programming interface, to the second application, data triggering the second application to automatically change the behavior of the apparatus appropriately in dependence on the time and meeting profile data and not in dependence on automatically acquired location sensor information;
  in an instance in which a conflict arises between the behavior change due to the time and meeting profile data from the first application and a different behavior change that depends on the automatically acquired location sensor information, determined whether the different behavior change prevails; and in response to determining that the different behavior change prevails, implement the different behavior change.

20. The apparatus of claim 19, wherein the apparatus comprises or is embodied on a wireless information device.

21. The method of claim 1, wherein the first application sends the data indirectly to the second application via the intermediate server.

22. The method of claim 1, wherein the intermediate server operates as an insulation layer separating the first and second applications.

* * * * *

UNITED STATES PATENT AND TRADEMARK OFFICE
CERTIFICATE OF CORRECTION

| | | |
|---|---|---|
| PATENT NO. | : 8,798,606 B2 | Page 1 of 1 |
| APPLICATION NO. | : 10/559959 | |
| DATED | : August 5, 2014 | |
| INVENTOR(S) | : Day | |

It is certified that error appears in the above-identified patent and that said Letters Patent is hereby corrected as shown below:

In the claims:

Column 6,
Line 37, "abdication" should read --application--;
Line 49, "implanting" should read --implementing--.

Column 7,
Line 36, "sever" should read --server--;
Lines 46 and 47, "time and meeting data" should read --time and meeting profile data--.

Column 8,
Line 29, "at least" should read --to at least--;
Line 31, "sever", both occurrences, should read --server--;
Line 38, "data triggering" should read --the data triggering--;
Line 48, "determined" should read --determine--.

Signed and Sealed this
Sixth Day of January, 2015

Michelle K. Lee
*Deputy Director of the United States Patent and Trademark Office*